US008993471B2

(12) United States Patent
Bai et al.

(10) Patent No.: US 8,993,471 B2
(45) Date of Patent: Mar. 31, 2015

(54) PHOTOCATALYTIC COATING

(75) Inventors: Feng Bai, Woodbury, MN (US); Rachael A. T. Gould, Forest Lake, MN (US); Mark T. Anderson, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 754 days.

(21) Appl. No.: 12/519,895

(22) PCT Filed: Dec. 17, 2007

(86) PCT No.: PCT/US2007/087701
§ 371 (c)(1),
(2), (4) Date: Jan. 22, 2010

(87) PCT Pub. No.: WO2008/079756
PCT Pub. Date: Jul. 3, 2008

(65) Prior Publication Data
US 2010/0152030 A1  Jun. 17, 2010

Related U.S. Application Data

(60) Provisional application No. 60/871,595, filed on Dec. 22, 2006.

(51) Int. Cl.
| B01J 23/00 | (2006.01) |
| B01J 21/02 | (2006.01) |
| B05D 7/00 | (2006.01) |
| E04D 13/00 | (2006.01) |
| B01J 35/00 | (2006.01) |
| B01J 37/02 | (2006.01) |
| C04B 20/10 | (2006.01) |
| C04B 28/26 | (2006.01) |
| C04B 41/50 | (2006.01) |
| C09D 1/02 | (2006.01) |
| C09D 5/16 | (2006.01) |
| C09D 7/12 | (2006.01) |
| E04D 7/00 | (2006.01) |
| C04B 111/00 | (2006.01) |
| C04B 111/20 | (2006.01) |
| C08K 3/22 | (2006.01) |

(52) U.S. Cl.
CPC ............. *E04D 13/002* (2013.01); *B01J 35/004* (2013.01); *B01J 37/0215* (2013.01); *C04B 20/1077* (2013.01); *C04B 28/26* (2013.01); *C04B 41/5089* (2013.01); *C09D 1/02* (2013.01); *C09D 5/1618* (2013.01); *C09D 7/1216* (2013.01); *E04D 7/005* (2013.01); C04B 2111/00586 (2013.01); C04B 2111/00827 (2013.01); C04B 2111/2061 (2013.01); C08K 3/22 (2013.01)
USPC ............................ 502/182; 502/202; 427/515

(58) Field of Classification Search
None
See application file for complete search history.

(56) References Cited

U.S. PATENT DOCUMENTS

| 4,130,538 | A | * | 12/1978 | Shutt .............................. 523/129 |
| 4,504,314 | A | | 3/1985 | Barker |
| 5,658,841 | A | | 8/1997 | Tanaka |
| 6,368,668 | B1 | | 4/2002 | Kobayashi et al. |
| 6,387,446 | B1 | | 5/2002 | Lobmann et al. |
| 6,569,520 | B1 | | 5/2003 | Jacobs |
| 6,881,701 | B2 | | 4/2005 | Jacobs |
| 7,594,962 | B2 | * | 9/2009 | Bujard et al. .................. 106/481 |
| 2002/0182334 | A1 | | 12/2002 | Marzolin et al. |
| 2005/0074580 | A1 | * | 4/2005 | Gross et al. .................... 428/143 |
| 2005/0142329 | A1 | * | 6/2005 | Anderson et al. ............. 428/143 |
| 2006/0264525 | A1 | | 11/2006 | Ohwaki et al. |

FOREIGN PATENT DOCUMENTS

| CN | 1266228 C | 7/2006 | ............... C09G 1/36 |
| DE | 19845291 | 4/2000 | |
| DE | 10 2004 053 708 | 5/2006 | |
| EP | 1 118 385 A1 | 7/2001 | |
| JP | 8318166 | 12/1996 | |
| JP | 11226419 | 8/1999 | |
| JP | 11-246787 | 9/1999 | |
| JP | 12288407 | 10/2000 | |
| JP | 2001-31907 | 2/2001 | |
| JP | 2002-80829 | 8/2002 | |
| JP | 15205244 | 7/2003 | |
| JP | 2003-268307 | 9/2003 | |
| JP | 2006008902 | 1/2006 | |
| JP | 2006-272660 | 10/2006 | |
| WO | WO 01/71121 A1 | 9/2001 | |
| WO | WO 02/068544 | 9/2002 | ............... C09C 1/36 |
| WO | WO2005/065153 | 7/2005 | |
| WO | WO 2005/083013 | 9/2005 | |
| WO | WO2005/083014 | 9/2005 | ............... C09D 1/00 |

OTHER PUBLICATIONS

U.S. Appl. No. 60/871,583, filed Dec. 22, 2006, Photocatalytic Coating.

U.S. Appl. No. 60/871,576, filed Dec. 22, 2006, Photocatalytic Coating.

Kim, S.-W., Kang, M., Choung, S.J., Preparation of a TiO2 film using a TEOS binder and its application to the photodegradation of benzene—(2005) *Journal of Industrial and Engineering Chemistry*, 11 (3), pp. 416-424.

Shibata, H., Sakai, H., Rangsunvigit, P., Hirano, T., Abe, M., Preparation and photocatalytic activity of titania participate film with silica as binder, (2003) *Surface Coatings International Part B: Coatings Transactions*, 86 (2), pp. 125-130.

Jones, W.M. and Fischbach, D.B., Novel processing of silica hydrosols and gels, (1998) J. of Non-Crystalline Solids, 101, p. 123-126.

(Continued)

*Primary Examiner* — Sarah A Slifka
(74) *Attorney, Agent, or Firm* — Craig A. Deutsch

(57) ABSTRACT

In one aspect, the present invention is directed to a coating composition. The coating composition comprises photocatalytic particles and an alkali metal silicate binder comprising a boric acid, borate, or combination thereof. In another aspect, the present invention is directed to a coated article. The coated article has a photocatalytic coating with improved durability on its external surface that is formed from the aforesaid coating composition.

21 Claims, No Drawings

(56) References Cited

OTHER PUBLICATIONS

"Photocatalytic Titanium Dioxide, ST/STS Series"; undated; 4 pages; presently available at http://www.iskweb.co.jp/eng/products/functional05.html.

Communication from European Patent Office on EP Appln No. 07869328.0 with extended European search report and opinion dated Aug. 22, 2012 (10 pgs).

* cited by examiner

PHOTOCATALYTIC COATING

FIELD OF INVENTION

The present invention relates to a coating composition and a coated article having a photocatalytic coating formed therefrom, particularly with application to building materials, such as, for example, roofing granules.

BACKGROUND

Discoloration of construction surfaces due to algae growth or other agents has been a problem for the construction industry for many years. Discoloration has been attributed to the presence of blue-green algae and other airborne contaminants, such as soot and grease.

One approach to combating this problem is to coat the construction surfaces with a composition that contains photocatalysts and a binder, typically a silicate binder. When exposed to sunlight, the photocatalysts may photo-oxidize the organic materials that cause the discoloration.

Photocatalytic titanium dioxide ($TiO_2$) particles can be used, for example, in roofing granules, to provide photocatalytic activity. To achieve long-term photocatalytic performance, a relatively high amount of silicate can be used in the coating composition. This may impact the color of the coated granules and reduce their photoactivity.

SUMMARY

The present invention is directed to a coating composition and a coated article resulting from the application of the coating composition.

The coating composition of the present invention generally includes photocatalytic particles and an alkali metal silicate binder comprising a boric acid, borate, or combination thereof. Preferably, the photocatalytic particles are transition metal catalysts. Particularly preferred photocatalysts include crystalline anatase $TiO_2$, crystalline rutile $TiO_2$, crystalline ZnO and combinations thereof. The photocatalytic particles used in the coating composition typically have a mean particle size in the range of about 1 nm to about 1000 nm. Preferred mean particle size is in the range of about 1 nm to about 200 nm, with a most preferred range of about 1 nm to about 100 nm. The coating composition has a solid weight percentage of the photocatalytic particles in the range of about 0.1% to about 90%. Preferred weight percentage is in the range of about 30% to about 80%, with a most preferred range of about 40% to about 70%. Alkali metal silicate binders suitable for use with the present invention include lithium silicate, sodium silicate, potassium silicate, and combinations thereof.

Any boric acid, including orthoboric acid, pyroboric acid, metaboric acid, tetraboric acid, pentaboric acid and other polyboric acids, may be used in the present invention. A preferred boric acid is orthoboric acid. Any borate, including anhydrous or hydrated orthoborates, pyroborates, metaborates, tetraborates, pentaborates and other polyborates, may also be used in the present invention. A preferred borate is sodium tetraborates (borax). A particularly preferred borate is sodium tetraborate pentahydrate (borax pentahydrate). The solid weight percentage of the boric acid, borate, or combination thereof used in the coating composition is typically more than about 0.1%. The preferred weight percentage is more than about 10%, with a most preferred percentage of more than about 20%.

Applying the coating composition onto a base article, followed by heating to elevated temperatures in a rotary kiln, oven or other suitable apparatus, produces a photocatalytic coating with improved durability. Preferred articles include building materials susceptible to discoloration due to algae growth or other agents, such as airborne particulates of dust, dirt, soot, pollen or the like. One particularly preferred article is roofing granules. The durability of the resulting coating measured using the Coating Durability Test described in the Examples section may be more than about 80%, more preferably more than about 90%, and most preferably about 100%.

DETAILED DESCRIPTION

The present invention is directed to a coating composition comprising photocatalytic particles and an alkali metal silicate binder comprising a boric acid, borate, or combination thereof and a coated article having a photocatalytic coating with improved durability. In the present invention, the durability of a photocatalytic coating is characterized using the Coating Durability Test described in the Examples section.

The photocatalytic coating is formed by applying the coating composition onto the base article, followed by heating to elevated temperatures of at least about 170° C. and up to about 650° C., with a preferred temperature of about 200° C. to about 450° C. The coating protects the base article against discoloration caused by algae growth or other agents. For purposes of the present invention, the coating may have multiple layers.

Base articles suitable for use with the present invention can be any ceramic, metallic, or polymeric materials or composites thereof that are capable of withstanding temperatures of at least about 170° C. Preferred articles include building materials that are susceptible to discoloration due to algae infestation or other agents, such as airborne particulates of dust, dirt, soot, pollen or the like. Examples include roofing materials, concrete and cement based materials, plasters, asphalts, ceramics, stucco, grout, plastics, metals or coated metals, glass, or combinations thereof. Additional examples include pool surfaces, wall coverings, siding materials, flooring, filtration systems, cooling towers, buoys, seawalls, retaining walls, boat hulls, docks, and canals. One particularly preferred article is roofing granules, such as those formed from igneous rock, argillite, greenstone, granite, trap rock, silica sand, slate, nepheline syenite, greystone, crushed quartz, slag, or the like, and having a particle size in the range from about 300 µm to about 5000 µm in diameter. Roofing granules are often partially embedded onto a base roofing material, such as, for example, asphalt-impregnated shingles, to shield the base material from solar and environmental degradation. Another particularly preferred article is tiles, such as those formed from ceramics, stones, porcelains, metals, polymers, or composites thereof. Tiles are often used for covering roofs, ceilings, floors, and walls, or other objects such as tabletops to provide wear, weather and/or fire resistances.

Photocatalysts are included in the coating composition of the present invention. Upon activation or exposure to sunlight, photocatalysts are thought to establish both oxidation and reduction sites. These sites are thought to produce highly reactive species such as hydroxyl radicals that are capable of preventing or inhibiting the growth of algae on the coated article, especially in the presence of water. Many photocatalysts conventionally recognized by those skilled in the art are suitable for use with the present invention. Preferred photocatalysts include transition metal photocatalysts. Examples of suitable transition metal photocatalysts include $TiO_2$, ZnO, $WO_3$, $SnO_2$, $CaTiO_3$, $Fe_2O_3$, $MoO_3$, $Nb_2O_5$, $Ti_xZr_{(1-x)}O_2$, SiC, $SrTiO_3$, CdS, GaP, InP, GaAs, $BaTiO_3$, $KNbO_3$, $Ta_2O_5$, $Bi_2O_3$, NiO, $Cu_2O$, $SiO_2$, $MoS_2$, InPb, $RuO_2$, $CeO_2$, $Ti(OH)_4$, and combinations thereof. Particularly preferred photocatalysts include crystalline anatase $TiO_2$, crystalline rutile $TiO_2$, crystalline ZnO and combinations thereof.

To improve spectral efficiency, photocatalysts may be doped with a nonmetallic element, such as C, N, S, F, or with a metal or metal oxide, such as Pt, Pd, Au, Ag, Os, Rh, $RuO_2$, Nb, Cu, Sn, Ni, Fe, or combinations thereof.

Photocatalytic particles may be characterized by mean particle size which can be determined using electron microscopy under ASTM D3849. The present invention typically uses photocatalytic particles having a mean particle size in the range of about 1 nm to about 1000 nm. Preferred mean particle size is in the range of about 1 nm to about 200 nm, with a most preferred range of about 1 nm to about 100 nm. Such photocatalytic particles have relatively large surface area per weight of particles and thus likely provide high photoactivity.

The coating composition of the present invention has a solid weight percentage of photocatalytic particles in the range of about 0.1% to about 90%. Preferred weight percentage is in the range of about 30% to about 80%, with a most preferred range of about 40% to about 70%.

Examples of suitable alkali metal silicate binders include lithium silicate, sodium silicate, potassium silicate, and combinations thereof. Alkali metal silicate is generally denoted as $M_2O:SiO_2$, where M is lithium, sodium, or potassium. The weight ratio of $SiO_2$ to $M_2O$ may range from about 1.4:1 to about 3.75:1. A preferred weight ratio is in the range of about 2.75:1 to about 3.22:1.

The alkali metal silicate binder comprises a boric acid, borate, or combination thereof. Any boric acid, including orthoboric acid, pyroboric acid, metaboric acid, tetraboric acid, pentaboric acid and other polyboric acids, may be used in the present invention. A preferred boric acid is orthoboric acid. Any borate, including anhydrous or hydrated orthoborates, pyroborates, metaborates, tetraborates, pentaborates and other polyborates, may also be used in the present invention. Examples include sodium borates, such as sodium perborate monohydrate, sodium perborate trihydrate, sodium perborate tetrahydrate, sodium metaborate dehydrate, sodium metaborate tetrahydrate, sodium tetraborate (anhydrous borax), sodium tetraborate tetrahydrate (borax tetrahydrate), sodium tetraborate pentahydrate (borax pentahydrate), sodium tetraborate decahydrate (borax decahydrate), sodium pentaborate pentahydrate, and sodium octaborate tetrahydrate; potassium borates, such as potassium tetraborate tetrahydrate and potassium pentaborate tetrahydrate; lithium borates, such as lithium tetraborate trihydrate, lithium metaborate dihydrate, and lithium metaborate octahydrate; calcium-containing borates, such as calcium hexaborate pentahydrate, sodium calcium pentaborate octahydrate, sodium calcium pentaborate pentahydrate; barium borates, such as barium metaborate monohydrate, barium metaborate tetrahydrate, and barium metaborate pentahydrate; zinc borates, such as zinc triborate monohydrate; and borate salts of copper, manganese, and cobalt. A preferred borate is sodium tetraborates (borax). A particularly preferred borate is sodium tetraborate pentahydrate (borax pentahydrate).

The use of a boric acid, borate, or combination thereof enhances the durability of the photocatalytic coating. Traditional approach to improving the durability of photocatalytic coatings is to increase the amount of alkali metal silicate used in the coating composition. In general, this has the effect of reducing the photoactivity of the coating, and in some cases, may also lighten the color. In contrast, the use of orthoboric acid or sodium tetraborate pentahydrate (borax pentahydrate) in the present invention produces good binding durability between, for example, the $TiO_2$ particles and the base granules. Consequently, the resulting photocatalytic coating has relatively long-term photocatalytic performance without substantially sacrificing vivid color and high photoactivity of the coated granules. Specifically, the use of orthoboric acid or sodium tetraborate pentahydrate (borax pentahydrate) in the present invention may result that the durability of the photocatalytic coating as measured using the Coating Durability Test described in the Examples section is more than about 80%, more preferably more than about 90%, and most preferably about 100%. To achieve enhanced durability, the solid weight percentage of the boric acid, borate, or combination thereof in the coating composition is typically more than about 0.1%. The preferred weight percentage is more than about 10%, with a most preferred percentage of more than about 20%.

The durability of the photocatalytic coating can also be enhanced by adding an alkoxysilane to the coating composition, as disclosed in PCT Publication No. WO 2008-079865, the entirety of which is incorporated herein by reference.

A pigment may be included in the coating composition to achieve a desired color. Suitable pigments include conventional pigments, such as carbon black, titanium oxide, chromium oxide, yellow iron oxide, phthalocyanine green and blue, ultramarine blue, red iron oxide, metal ferrites, and combinations thereof.

The photocatalytic coating of the present invention can be transparent, as disclosed in PCT Publication No. WO 2008-079754, the entirety of which is incorporated herein by reference.

EXAMPLES

The operation of the present invention will be further described with regard to the following detailed examples. These examples are offered to further illustrate the various specific and preferred embodiments and techniques. It should be understood, however, that many variations and modifications may be made while remaining within the scope of the present invention.

Photocatalytic Activity Test

The granules were sieved through a −16/+20 mesh, washed 5 times by deionized water and then dried at 240° F. (~116° C.) for about 20 minutes. 40 g of the dried granules was placed into a 500 mL crystallization dish. 500 g of $4 \times 10^{-4}$ M aqueous disodium terephthalate solution was then added to the dish. The mixture was stirred using a bar placed in a submerged small Petri dish and driven by a magnetic stirrer underneath the crystallization dish. The mixture was exposed to UV light produced by an array of 4, equally spaced, 4-ft (1.2-m) long black light bulbs (Sylvania 350 BL 40W F40/350BL) that were powered by two specially designed ballasts (Action Labs, Woodville, Wis.). The height of the bulbs was adjusted to provide about 2.3 $mW/cm^2$ UV flux measured using a VWR Model 21800-016 UV Light Meter (VWR International, West Chester, Pa.) equipped with a UVA Model 365 Radiometer (Solar Light Company, Glenside, Pa.) having a wavelength band of 320-390 nm.

During irradiation, about 3 mL of the mixture was removed with a pipet at about 5-minute intervals and transferred to a disposable 4-window polymethylmethacrylate or quartz cuvette. The mixture in the cuvette was then placed into a Fluoromax-3 spectrofluorimeter (Jobin Yvon, Edison, N.J.). The fluorescence intensity measured at excitation wavelength of 314 nm and emission wavelength of 424 nm was plotted against the irradiation time. The slope of the linear portion (the initial 3-5 data points) of the curve was indicative of the photocatalytic activity of the mixture. A comparison of this slope with that for the aqueous disodium terephthalate solution provided to the relative photoactivity of the granules as reported. In general, the larger the reported value, the greater the photoactivity of the granules.

Coating Durability Test:

The granules were sieved through a −16/+20 mesh without washing. 50 g of the granules was added to a four oz. glass jar. The jar was then placed onto a motorized roller (available from Bodine Electric Company, Chicago, Ill.) tilted at an angle of about 17 degree to the floor plane and kept rolling for one hour at a rolling speed of about 35 rpm. The rolled granules were washed with deionized water and their photoactivity was measured according to the Photocatalytic Activity Test described above. The photoactivity of the unrolled granules was also measured. The photoactivity ratio (expressed in percentage) of the rolled granules to the unrolled granules was reported as "durability". The higher the ratio, the more durable the coating.

Working Examples 1-3 and Comparative Examples A&B

The sample for Working Example 1 was prepared as follows. 2.00 g of aqueous dispersion of $TiO_2$ (W2730X, 30 wt %, experimental product available from Degussa AG, Dusseldorf, Germany), 31.80 g of deionized water, 1.44 g of potassium silicate (Potassium Silicate Kasil 1, 28.91 wt % with 2.47 wt % ratio of $SiO_2/K_2O$, available from PQ Corporation, Valley Forge, Pa.), and 18.20 g of 0.5 wt % aqueous solution of orthoboric acid (99% purity, available from Sigma-Aldrich, St. Louis, Mo.) were added to a 250 mL vessel and mixed well. The resulting mixture was then slowly poured onto 1000 g of stirring WA 7100 granules (untreated, available from 3M Company, St. Paul, Minn.), which had been pre-heated to 210° F. (~99° C.) for one hour. While pouring, the granules were mixed to ensure an even coating. The granules were further stirred for about 2 minutes. The granules were then heated with a heat gun until they appeared to be dry and loose. The dried granules were then fired in a rotary kiln (natural gas/oxygen flame) to 600° F. (~316° C.), and removed and allowed to cool to room temperature. The samples for Working Examples 2&3 were prepared using the same procedure except than different coating compositions were used. The samples for Comparative Examples A&B were prepared also using the same procedure except that orthoboric acid was not used. The compositions of the photocatalytic coatings for Working Examples 1-3 and Comparative Examples A&B are listed in Table 1.

The durability of the cooled granules was measured according to the testing procedure described above, and reported in Table 1. The results show that use of orthoboric acid in combination with potassium silicate leads to superior durability. Further, the results show that use of orthoboric acid significantly increases photoactivity.

TABLE 1

Compositions of Photocatalytic Coating and Durability of Coated Granules for Working Examples 1-3 and Comparative Examples A&B.

| Example | W2730X (g) | DI $H_2O$ (g) | Potassium Silicate Kasil 1 (g) | Orthoboric Acid Solution (g) | Firing Temp (° F.) | Photoactivity (before rolling) | Durability (%) |
|---|---|---|---|---|---|---|---|
| 1 | 2.00 | 31.80 | 1.44 | 18.20 | 600 | $8.31 \times 10^5$ | 89 |
| 2 | 2.00 | 13.60 | 1.44 | 36.40 | 600 | $8.72 \times 10^5$ | 92 |
| 3 | 2.00 | 13.60 | 2.88 | 36.40 | 600 | $6.67 \times 10^5$ | 95 |
| A | 2.00 | 41.20 | 1.44 | 0 | 600 | $7.31 \times 10^5$ | 74 |
| B | 2.00 | 32.90 | 2.88 | 0 | 600 | $2.60 \times 10^5$ | 78 |

Working Examples 4-6

The samples for Working Examples 4-6 were prepared using the same procedure as that for preparing the sample for Working Example 1. The compositions of the photocatalytic coatings for Working Examples 4-6 are listed in Table 2 (for comparison, the compositions for Comparative Examples A&B are also listed). Compared with Working Example 1, sodium tetraborate pentahydrate (borax pentahydrate) was used in place of orthoboric acid. Specifically, 2 wt % aqueous solution of sodium tetraborate pentahydrate (Borax Pentahydrate ETIBOR 48, available from American Borate Company, Virginia Beach, Va.) was used.

The durability of the coated granules was measured and reported in Table 2 (for comparison, durability for Comparative Examples A&B are also listed). The results show that use of sodium tetraborate pentahydrate (borax pentahydrate) in combination with potassium silicate gives rise to excellent durability. Further, the results show that use of sodium tetraborate pentahydrate (borax pentahydrate) substantially increases photoactivity.

TABLE 2

Compositions of Photocatalytic Coating and Durability of Coated Granules for Working Examples 4-6 (for comparison, compositions and durability for Comparative Examples A&B are also listed).

| Example | W2730X (g) | DI $H_2O$ (g) | Potassium Silicate Kasil 1 (g) | Borax Pentahydrate ETIBOR 48 Solution (g) | Firing Temp (° F.) | Photoactivity (before rolling) | Durability (%) |
|---|---|---|---|---|---|---|---|
| 4 | 2.00 | 28.55 | 2.88 | 21.45 | 600 | $9.78 \times 10^5$ | 83 |
| 5 | 2.00 | 7.25 | 1.44 | 42.75 | 600 | $1.10 \times 10^6$ | 95 |

TABLE 2-continued

Compositions of Photocatalytic Coating and Durability of Coated Granules for Working Examples 4-6 (for comparison, compositions and durability for Comparative Examples A&B are also listed).

| Example | W2730X (g) | DI H$_2$O (g) | Potassium Silicate Kasil 1 (g) | Borax Pentahydrate ETIBOR 48 Solution (g) | Firing Temp (° F.) | Photoactivity (before rolling) | Durability (%) |
|---|---|---|---|---|---|---|---|
| 6 | 2.00 | 7.25 | 2.88 | 42.75 | 600 | $1.06 \times 10^6$ | 96 |
| A | 2.00 | 41.20 | 1.44 | 0 | 600 | $7.31 \times 10^5$ | 74 |
| B | 2.00 | 32.90 | 2.88 | 0 | 600 | $2.60 \times 10^5$ | 78 |

The tests and test results described above are intended solely to be illustrative, rather than predictive, and variations in the testing procedure can be expected to yield different results. The present invention has now been described with reference to several embodiments thereof. The foregoing detailed description and examples have been given for clarity of understanding only. No unnecessary limitations are to be understood therefrom. All patents and patent applications cited herein are hereby incorporated by reference. It will be apparent to those skilled in the art that many changes can be made in the embodiments described without departing from the scope of the invention. Thus, the scope of the present invention should not be limited to the exact details and structures described herein, but rather by the structures described by the language of the claims, and the equivalents of those structures.

The invention claimed is:

1. A coated article, comprising:
a roofing granule having an external surface and a coating on the external surface, wherein the coating is formed from a composition comprising photocatalytic TiO$_2$ particles and an alkali metal silicate binder, wherein the alkali metal silicate binder further comprises a boric acid or a combination of the boric acid and a sodium tetraborate pentahydrate.

2. The coated article of claim 1, wherein the photocatalytic particles comprise crystalline anatase TiO$_2$, crystalline rutile TiO$_2$, crystalline ZnO, or combinations thereof.

3. The coated article of claim 1, wherein the photocatalytic particles are doped with C, N, S, F, Pt, Pd, Au, Ag, Os, Rh, RuO$_2$, Nb, Cu, Sn, Ni, Fe, or combinations thereof.

4. The coated article of claim 1, wherein the boric acid comprises an orthoboric acid.

5. The coated article of claim 1, wherein the alkali metal silicate binder comprises a boric acid and a sodium tetraborate pentahydrate.

6. The coated article of claim 1, wherein the photoactivity of the coating is increased, compared with a coating formed from a like composition except no boric acid or the combination of the boric acid and the sodium tetraborate pentahydrate is used therein.

7. The coated article of claim 1, wherein the alkali metal silicate binder comprises lithium silicate, sodium silicate, potassium silicate, or combinations thereof.

8. The coated article of claim 1, wherein the alkali metal silicate binder further comprises a pigment.

9. The coated article of claim 1, wherein the coating further comprises an alkoxysilane.

10. The coated article of claim 1, wherein the alkali metal silicate binder comprises an orthoboric acid and a sodium tetraborate pentahydrate, and the solid weight percentage of the sodium tetraborate pentahydrate in the coating composition is greater than 10%.

11. A coated roofing granule, comprising:
a roofing granule having an external surface and a coating on the external surface of the roofing granule, wherein the coating is formed from a composition comprising photocatalytic TiO$_2$ particles and an alkali metal silicate binder, wherein the alkali metal silicate binder further comprises a boric acid or a combination of the boric acid and a borate.

12. A method of making a coated article, comprising:
providing a roofing granule having an external surface, providing a composition comprising photocatalytic particles and an alkali metal silicate binder, wherein the alkali metal silicate binder further comprises a boric acid or a combination of the boric acid and a borate, depositing the composition onto the roofing granule, and heating the deposited roofing granule to form a coating thereon.

13. The method of claim 12, wherein the photocatalytic particles comprise TiO$_2$, ZnO, WO$_3$, SnO$_2$, CaTiO$_3$, Fe$_2$O$_3$, MoO$_3$, Nb$_2$O$_5$, Ti$_x$Zr$_{(1-x)}$O$_2$, SiC, SrTiO$_3$, CdS, GaP, InP, GaAs, BaTiO$_3$, KNbO$_3$, Ta$_2$O$_5$, Bi$_2$O$_3$, NiO, Cu$_2$O, SiO$_2$, MoS$_2$, InPb, RuO$_2$, CeO$_2$, Ti(OH)$_4$, or combinations thereof.

14. The method of claim 12, wherein the photocatalytic particles comprise crystalline anatase TiO$_2$, crystalline rutile TiO$_2$, crystalline ZnO, or combinations thereof.

15. The method of claim 12, wherein the photocatalytic particles are doped with C, N, S, F, Pt, Pd, Au, Ag, Os, Rh, RuO$_2$, Nb, Cu, Sn, Ni, Fe, or combinations thereof.

16. The method of claim 12, wherein the boric acid comprises an orthoboric acid.

17. The method of claim 12, wherein the alkali metal silicate binder comprises a boric acid and a sodium tetraborate pentahydrate.

18. The method of claim 12, wherein the photoactivity of the coating is increased, compared with a coating formed from a like composition except no boric acid or the combination of the boric acid and the borate is used therein.

19. The method of claim 12, wherein the alkali metal silicate binder comprises lithium silicate, sodium silicate, potassium silicate, or combinations thereof.

20. The method of claim 12, wherein the alkali metal silicate binder further comprises a pigment.

21. A method of making a coated roofing granule, comprising: providing a roofing granule having an external surface, providing a composition comprising photocatalytic TiO$_2$ particles and an alkali metal silicate binder, wherein the alkali metal silicate binder further comprises a boric acid or a combination of the boric acid and a borate, depositing the composition onto the roofing granule, and heating the deposited roofing granule to form a coating thereon.

* * * * *